United States Patent
Gladnick et al.

(10) Patent No.: US 7,110,036 B2
(45) Date of Patent: Sep. 19, 2006

(54) SYSTEMS AND METHODS FOR IDENTIFYING A LENS USED IN A VISION SYSTEM

(75) Inventors: Paul Gladnick, Seattle, WA (US); Ana M Tessadro, Seattle, WA (US)

(73) Assignee: Mitutoyo Corporation, Kawasaki (JP)

( * ) Notice: Subject to any disclaimer, the term of this patent is extended or adjusted under 35 U.S.C. 154(b) by 819 days.

(21) Appl. No.: 10/284,290

(22) Filed: Oct. 31, 2002

(65) Prior Publication Data

US 2004/0085453 A1    May 6, 2004

(51) Int. Cl.
H04N 5/225    (2006.01)
H04N 7/18    (2006.01)
G01B 11/00    (2006.01)

(52) U.S. Cl. .................. 348/360; 348/86; 348/132; 356/398

(58) Field of Classification Search ............... 348/79, 348/86, 87, 94, 95, 131, 132, 360, 361, 370, 348/371; 250/559.05, 559.07, 559.08; 356/398
See application file for complete search history.

(56) References Cited

U.S. PATENT DOCUMENTS

| | | | |
|---|---|---|---|
| 4,643,540 A | 2/1987 | Kawasaki et al. | |
| 5,291,335 A | 3/1994 | Ogino | |
| 5,703,714 A * | 12/1997 | Kojima | 348/79 |
| 5,864,523 A | 1/1999 | Yoshizawa | |
| 6,239,554 B1 | 5/2001 | Tessadro et al. | |
| 6,346,966 B1 * | 2/2002 | Toh | 348/79 |
| 6,396,532 B1 * | 5/2002 | Hoover et al. | 348/79 |
| 2004/0223053 A1 * | 11/2004 | Gladnick et al. | 348/79 |
| 2005/0031191 A1 * | 2/2005 | Venkatachalam | 382/152 |
| 2005/0052734 A1 * | 3/2005 | Kawanabe et al. | 359/385 |
| 2005/0109959 A1 * | 5/2005 | Wasserman et al. | 250/559.19 |

FOREIGN PATENT DOCUMENTS

| | | |
|---|---|---|
| JP | A-4-127769 | 4/1992 |
| JP | A-6-78314 | 3/1994 |
| WO | WO99/51037 | * 10/1999 |

OTHER PUBLICATIONS

U.S. Appl. No. 09/484,897, filed Jan. 18, 2000, Wasserman et al.
U.S. Appl. No. 09/736,187, filed Dec. 15, 2000, Wasserman.
U.S. Appl. No. 09/921,886, filed Aug. 6, 2001, Silber et al.
U.S. Appl. No. 09/987,986, filed Nov. 16, 2001, Tessadro.

* cited by examiner

Primary Examiner—David Ometz
Assistant Examiner—John M. Villecco
(74) Attorney, Agent, or Firm—Oliff & Berridge, PLC

(57) ABSTRACT

Systems and methods for identifying an interchangeable lens in a vision system having a controllable light source, a camera, and the lens to be identified. Light provided by the light source is transferred to the camera by the lens to be identified. The amount of light transferred to the camera for a particular reference configuration of the vision system depends distinguishably on the characteristics of the lens to be identified. A camera output is measured for a desired light source setting and the desired light source setting and associated measured camera output are compared with stored lens identification calibration data. The stored lens identification calibration data is obtained by measuring the camera output for a plurality of lenses using a plurality of light source settings. In various exemplary embodiments, the light transferred from the light source to the camera is reflected and/or backscattered light from the lens to be identified.

16 Claims, 10 Drawing Sheets

SYSTEMS AND METHODS FOR IDENTIFYING A LENS USED IN A VISION SYSTEM

BACKGROUND OF THE INVENTION

1. Field of Invention

This invention relates to automatic machine vision systems.

2. Description of Related Art

Conventional machine vision systems perform dimensional measurements of specific target features of a sample workpiece. One such use of a vision system is, for example, measuring the position or other characteristic of specific target features of a sample workpiece for comparison to a standard or reference value for the position or other characteristic of the workpiece. In such an application, a lens is used to focus on specific target features.

Different magnifying objective lenses having different optical characteristics are often appropriate when viewing different target features and/or when measuring different characteristics. To use different lenses, one lens is removed from the vision system and another is used in its place. When replacing the lens, the physical characteristics of the lens must be known so that an operator can accurately measure specific target features. These physical characteristics include, but are not limited to, the aperture, the optical configuration of the lens, the optical resolution of the lens, as well as other imaging characteristics that are unique to the lens.

SUMMARY OF THE INVENTION

One method of identifying the lens is for the operator to observe the manufacturing label on the lens in order to determine identification information on the label. The identification information includes information regarding the physical characteristics of the lens. However, such methods require that the operator locate the label. Locating the label can be difficult if it is not done before the lens is inserted into the vision system. This occurs because the operator often must position himself awkwardly to observe the label. Furthermore, the operator may have to position himself unsafely close to the machine to positively identify the lens.

After the operator identifies the lens, the operator must then input the identification information into a machine vision controller, such that various image-processing operations or other control operations properly correspond to the lens. To input the identification information, time and effort is expended by the user. Also, errors can occur in the operation of the vision machine if the operator does not accurately input the correct identification information.

Another method for identifying the lens is for a lens label to be automatically scanned by a scanner or for a sensor of the machine vision systems to otherwise optically or electronically obtain information encoded in features on the lens. These methods use a scanner or sensor that is located within the vision system. Thus, the information located on the lens can be obtained and input into the controller. However, increased hardware costs and increased difficulties in modifying legacy vision systems are created. Furthermore, various lens identification systems will be incompatible with various lenses that might otherwise be used on a vision system.

Thus, in many practical cases, conventional methods do not offer reasonable solutions for accurately and quickly determining the physical characteristics of a lens. Thus, there is a need for simple and automatic methods or devices that can identify interchangeable lenses in an automatic machine vision system.

This invention provides systems and methods that automatically identify a lens that does not include specially-created identifying marks or features.

This invention separately provides systems and methods that identify a lens using a limited number of automatic setup conditions.

This invention separately provides systems and methods that use a vision system camera and lighting system to identify a lens based on a consistent light transfer characteristic of the lens.

This invention separately provides systems and methods that identify a lens by taking a series of featureless image measurements using a vision system camera and lighting.

This invention provides systems and methods that identify a lens by taking a series of featureless-image based measurements that allow the classification of a current lens based on a database of measurements of known lenses.

This invention separately provides systems and methods that take advantage of a predetermined set of lens identification calibration values for a particular lens set.

This invention separately provides systems and methods that take advantage of varying reflection characteristics of various lenses.

This invention separately provides systems and methods that identify a lens by positioning an inherent part of the workpiece stage in the field of view.

This invention separately provides systems and methods that identify a lens without the need for repositioning an X-Y stage or workpiece of the vision system.

This invention separately provides systems and methods that identify a lens by measuring its effect on the energy transfer from a light source to a camera system.

This invention separately provides systems and methods that identify a lens without placing a target in focus on the field of view of the lens.

This invention separately provides systems and methods that are insensitive to unpredictable variations that may occur in a field of view illuminated by a light source used for the lens identification.

This invention separately provides systems and methods that are compensated or calibrated for the different coatings, properties and tolerances of different lenses.

This invention separately provides systems and method that compensate for unpredictable energy level output variations that occur over the life of a light source used for the lens identification.

This invention separately provides systems and methods that select a plurality of optical system components used to return light from a lens to a camera in order to normalize the measurements used to identify the lens.

This invention separately provides systems and methods that are compensated or calibrated for using a family of lenses for a plurality of vision systems having certain design variations.

In various exemplary embodiments of the systems and methods according to this invention, the vision system includes a motion system, a camera, a light source that emits source light at desired light source settings, a lens to be identified that transfers light from the light source to the camera, and a controller. The controller and the motion system are used to put the vision system into a reference configuration. The controller receives a camera output for the desired light source settings and compares the desired light source settings and associated measured camera outputs with stored lens identification calibration data for various lenses. In various exemplary embodiments, each measured camera output is the total of all light intensity values, or gray level values, of all the pixels of the camera.

In various other exemplary embodiments, each measured camera output is the sum of the intensity values of a consistent subset of the pixels of the camera. In various exemplary embodiments, each measured camera output is an average intensity value based on the intensity values, or gray level values, of all the pixels of the camera or a subset of all the pixels of the camera. In various other exemplary embodiments, each measured camera output is the result of an image processing operation that includes analyzing more than one consistent subset of the pixels of the camera for their intensities and/or a relationship between their intensities. The lens is identified based on the comparison. The stored lens identification calibration data was previously obtained by measuring the camera output for a plurality of lenses using a plurality of light source settings.

In various exemplary embodiments, the light source is a coaxial light source, and the reference configuration includes moving the lens to be identified out of its focus range relative to any objects in the field of view. The light transferred from the lens to be identified to the camera includes a significant proportion of the coaxial light reflected and/or backscattered from the lens to be identified.

In various other exemplary embodiments, the light source is a surface light or a stage light and the reference configuration includes positioning a known surface portion or target of the vision system in a reference position relative to the lens to be identified.

In various other exemplary embodiments, the vision system further includes a turret assembly with at least two different turret lenses that differently modify the light transferred from the lens to be identified before it is received by the camera. The camera receives the modified transmitted light from the turret assembly. The controller measures at least two camera outputs for the at least two turret lenses at a desired light source setting and compares the at least two camera outputs and the at least two turret lenses with stored lens identification calibration data. The lens is identified based on the comparison.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1:
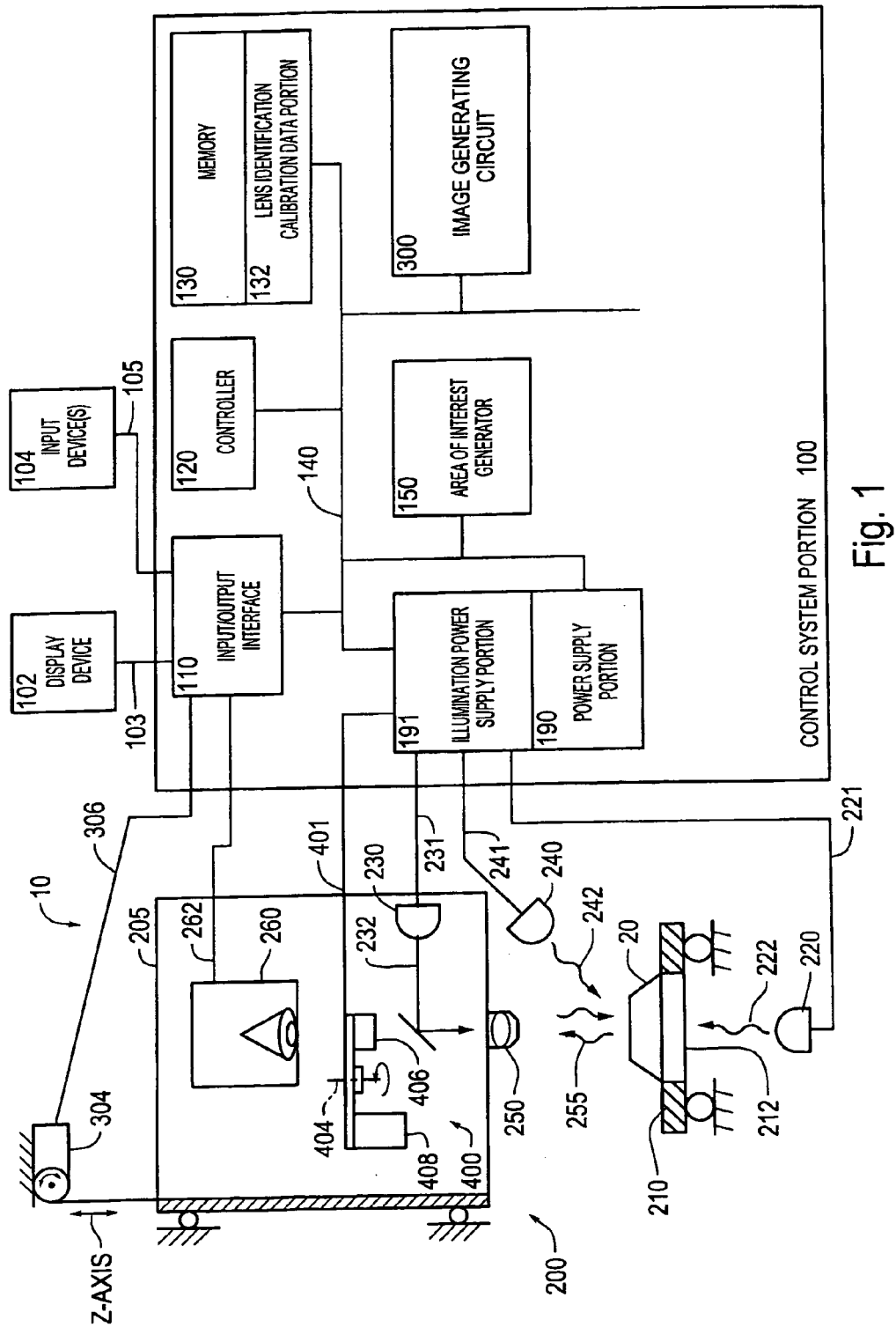
FIG. 1 is a block diagram of a first exemplary embodiment of a vision system usable with various exemplary embodiments of the systems and methods according to this invention.

For simplicity and clarification, the operating principles and design factors of this invention are explained with reference to one exemplary embodiment of a vision system according to this invention, as shown in FIG. 1. The basic explanation of the operation of the vision system shown in FIG. 1 is applicable for the understanding and design of any vision system that incorporates the illumination selection systems and methods according to this invention.

FIG. 1 shows one exemplary embodiment of a vision system 10 according to this invention. As shown in FIG. 1, the vision system 10 includes a control system portion 100 and a vision system components portion 200. The vision system components portion 200 includes an optical assembly portion 205 and a stage 210 having a central transparent portion 212. The optical assembly portion 205 includes a camera system 260, an interchangeable objective lens 250, a turret lens assembly 400, and a coaxial light source 230. It should be appreciated the objective lens 250 is the interchangeable lens to be identified according to this invention, as described further below. It should also be appreciated the lenses of the turret lens assembly 400 are not the lenses to be identified according to this invention. Rather the turret lens assembly 400 is assumed to be an internal "fixed configuration" assembly in the following description of various exemplary systems and methods according to this invention.

A workpiece 20 to be imaged using the vision system 10 is placed on the stage 210. One or more of the light sources 220, 230 and 240 emits source light 222, 232, or 242, respectively, that is usable to illuminate the workpiece 20. Light emitted by the light sources 220, 230 and/or 240 illuminates the workpiece 20 and is reflected or transmitted as workpiece light 255, which passes through the interchangeable objective lens 250 and the turret lens assembly 400 and is gathered by the camera system 260, which together act as an imaging system to generate an image of the workpiece 20. The image of the workpiece 20, captured by the camera system 260, is output on a signal line 262 to the control system portion 100.

The light sources 220–240 used to illuminate the workpiece 20 can include a stage light 220, the coaxial light 230, and a surface light 240, such as a ring light or a programmable ring light, all connected to the control portion 100 through signal lines or busses 221, 231 and 241, respectively. As a primary optical assembly of the vision system 10, the optical assembly portion 205 may include, in addition to the previously discussed components, other lenses, and other optical elements such as apertures, beamsplitters and the like, such as may be needed for providing coaxial illumination, or other desirable vision system features. As a secondary optical assembly of the vision system 10, the turret lens assembly 400 includes at least a first turret lens position and lens 406 and a second turret lens position and lens 408. The control portion 100 rotates the turret lens assembly 400 along axis 404 between, at least the at least first and second turret lens positions through a signal line or bus 401.

The distance between the stage 210 and the optical assembly portion 205 can be adjusted to change the focus of the image of the workpiece 20 captured by the camera system 260. In particular, in various exemplary embodiments of the vision system 10, the optical assembly portion 205 is movable in a vertical "z-axis" direction relative to the stage 210 using a controllable motor 304 that drives an actuator, a connecting cable, or the like, to move the optical assembly portion 205 along the z-axis. The term z-axis, as used herein, refers to the axis that is intended to be used for focusing the image obtained by the optical assembly portion 205. The controllable motor 304, when used, is connected to the input/output interface 110 via a signal line 306.

As shown in FIG. 1, in various exemplary embodiments, the control portion 100 includes an input/output interface 110, a controller 120, a memory 130, including a lens identification calibration data portion 132, an area of interest generator 150, and a power supply 190 including an illumination power supply portion 191, each interconnected either by one or more data/control busses and/or application programming interfaces 140 or by direct connections between the various elements. The signal lines or busses 221, 231 and 241 of the stage light 220, the coaxial light 230, and the surface light 240, respectively, are all connected to the illumination power supply portion 191. The signal line 262 from the camera system 260 and the signal line 306 from the controllable motor 304 are connected to the input/output interface 110. In addition to carrying image data, the signal line 262 may carry a signal from the controller 120 or the image generating circuit or routine 300 that initiates image acquisition.

A display device 102 can also be connected to the input/output interface 110 over a signal line 103. One or more input devices 104 can be connected to the input/output interface 110 over one or more signal lines 105. The display device 102 and the one or more input devices 104 can be used to view, create and/or modify part programs, to view the images captured by the camera system 260 and/or to directly control the vision system components portion 200. However, it should be appreciated that, in a fully automated system having a predefined part program, the display device 102 and/or the one or more input devices 104, and the corresponding signal lines 103 and/or 105, may be omitted.

The memory portion 130 stores data usable to operate the vision system components portion 200 to capture an image of the workpiece 20 such that the input image of the workpiece 20 has desired image characteristics. The memory portion 130 further stores data usable to operate the vision system 10 to perform various inspection and measurement operations on the captured images, either manually or automatically, and to output the results through the input/output interface 110. The memory 130 also contains data defining a graphical user interface operable through the input/output interface 110. The lens identification calibration data portion 132 stores various lens identification calibration data comparing various camera outputs and light source settings for various lenses to be identified. In various exemplary embodiments, turret lens position data are included in the lens identification calibration data.

As shown in FIG. 1, the vision system 10 also includes an image generating circuit, routine or application 300. The image generating circuit, routine or application 300 is usable to determine image acquisition settings and/or acquire an image of the workpiece 20 such that the input image of the workpiece 20 has desired image characteristics in a region of interest. The image generating circuit, routine or application 300 can use a tool, such as a dual area contrast tool, an edge tool or a multi-channel lighting tool, as variously disclosed in U.S. patent application Ser. Nos. 09/484,897, 09/736,187, 09/921,886, and 09/987,986, each incorporated herein by reference in its entirety.

The term image characteristic, as used herein, in various exemplary embodiments, can refer to relatively high level image results, such as texture characteristics, edge characteristics and the like, that support the proper operation of various image tools, such as the dual area contrast tool, edge tools and the like discussed above. The term image characteristic, as used herein, furthermore can include within its scope the various determined parameters, operation results, and combinations of results underlying various vision system tools, including the various determined parameters, operation results, and combinations of results referred to as image results in the various incorporated references.

Additional exemplary tools and methods usable in combination with this invention are evident in commercial machine vision systems such as the Quick Vision series of vision inspection machines and QVPAK software available from Mitutoyo America Corporation (MAC), located in Aurora, Ill. However, it should be appreciated that any such tool, whether currently available or later developed, can be used to determine image acquisition settings and/or acquire an image of the workpiece 20 having desired image characteristics in a region of interest.

It should be appreciated that, in various exemplary embodiments, the systems and methods according to this invention utilize the varying degrees of energy transfer between a light source and a camera, which occur due to the different lens characteristics of different intervening lenses, to identify the lens. Thus, in various exemplary embodiments according to this invention, conditions are provided which establish the lens to be identified as the primary variable controlling the transfer of the light from a particular light source to the camera of the vision system. When the lens to be identified is the primary variable, then one lens can be distinguished from another based on the different transfer relationship that each lens establishes for the camera output level relative to the light source level.

Accordingly, in various exemplary embodiments disclosed with reference to FIGS. 2–11, the vision system is configured in a reference configuration as one part of the lens identification operations. In general, the reference configuration encompasses at least selecting the reference light source and the relative positions of the optical assembly portion 205 relative to the stage 210. In general, the reference configuration provides a standard configuration that tends to reduce, and ideally minimize, and/or control certain other variables and variations that may influence the transfer of the light from the particular light source to the camera during lens identification. Furthermore, in various exemplary embodiments according to this invention, the reference configuration also tends to reduce, and ideally minimize, or control any effects caused by ambient light, a reflectance of a workpiece that may be in the nominal field of view, and the like. Various particular reference configurations are discussed in greater detail below.

Figure 2:
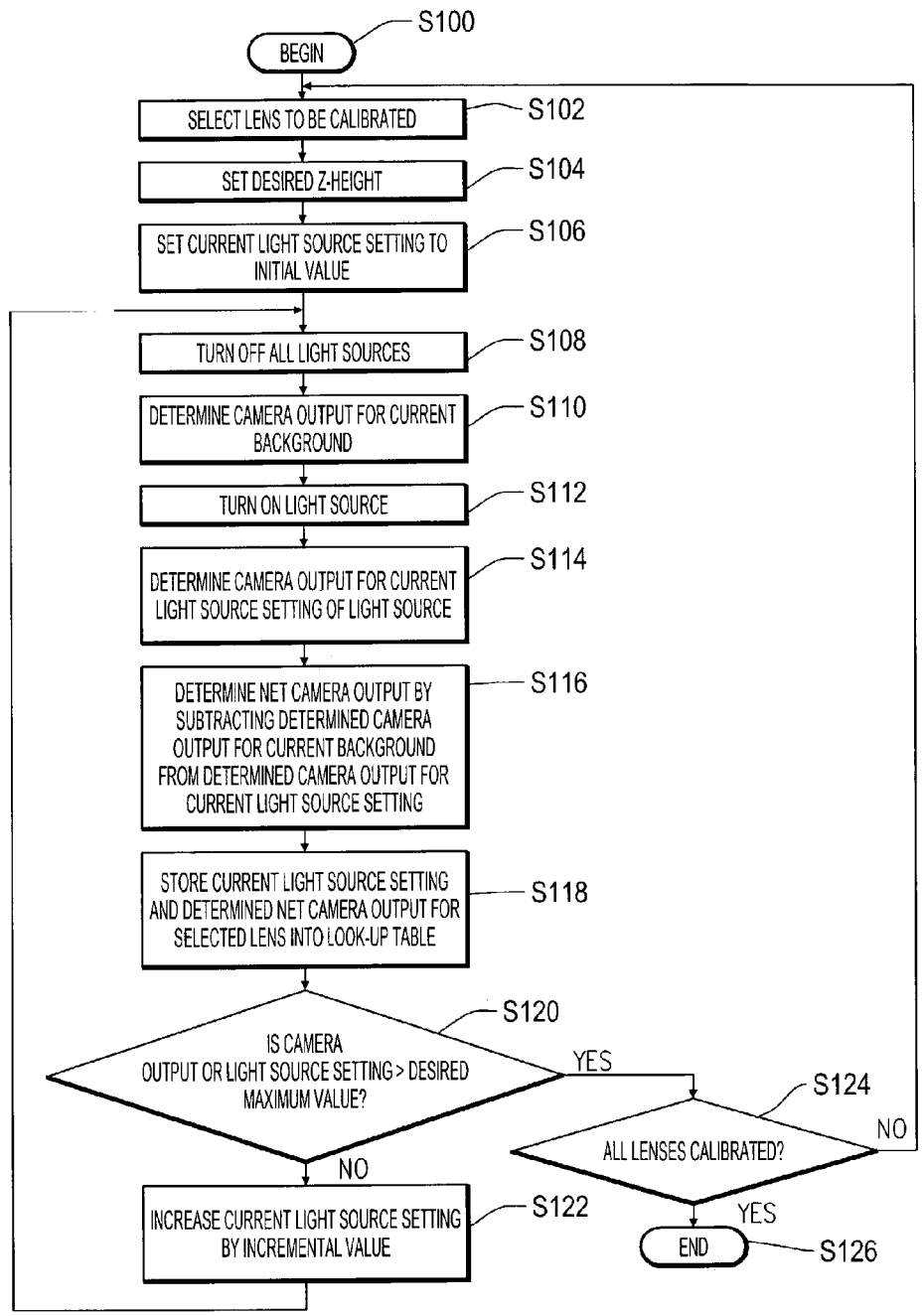
FIG. 2 is a flowchart outlining a first exemplary embodiment of a method for determining lens identification calibration data for several light source settings with camera outputs according to this invention.
Figure 3:
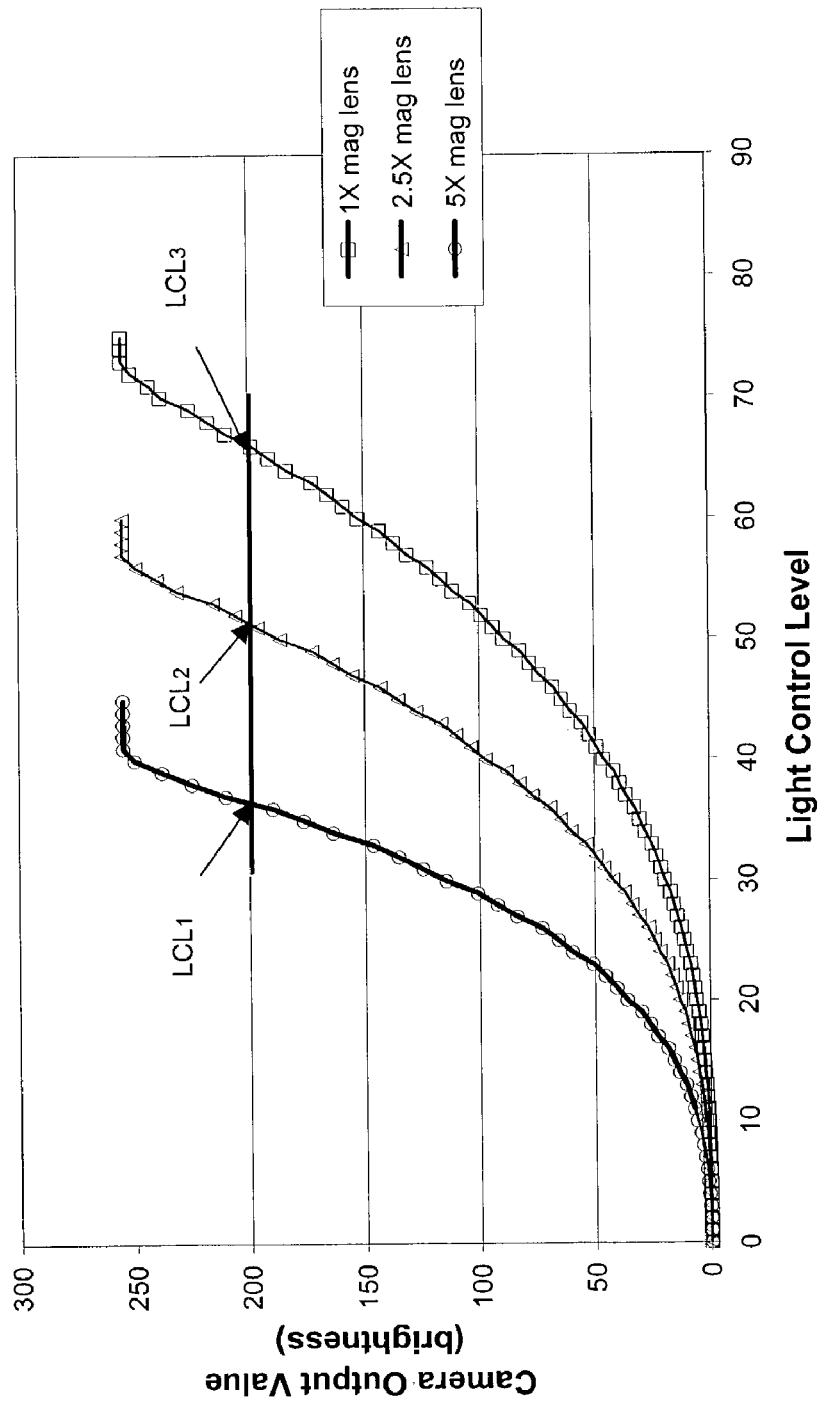
FIG. 3 is a first graph comparing lens identification calibration data for several light source settings with camera outputs for a plurality of lenses.
Figure 4:
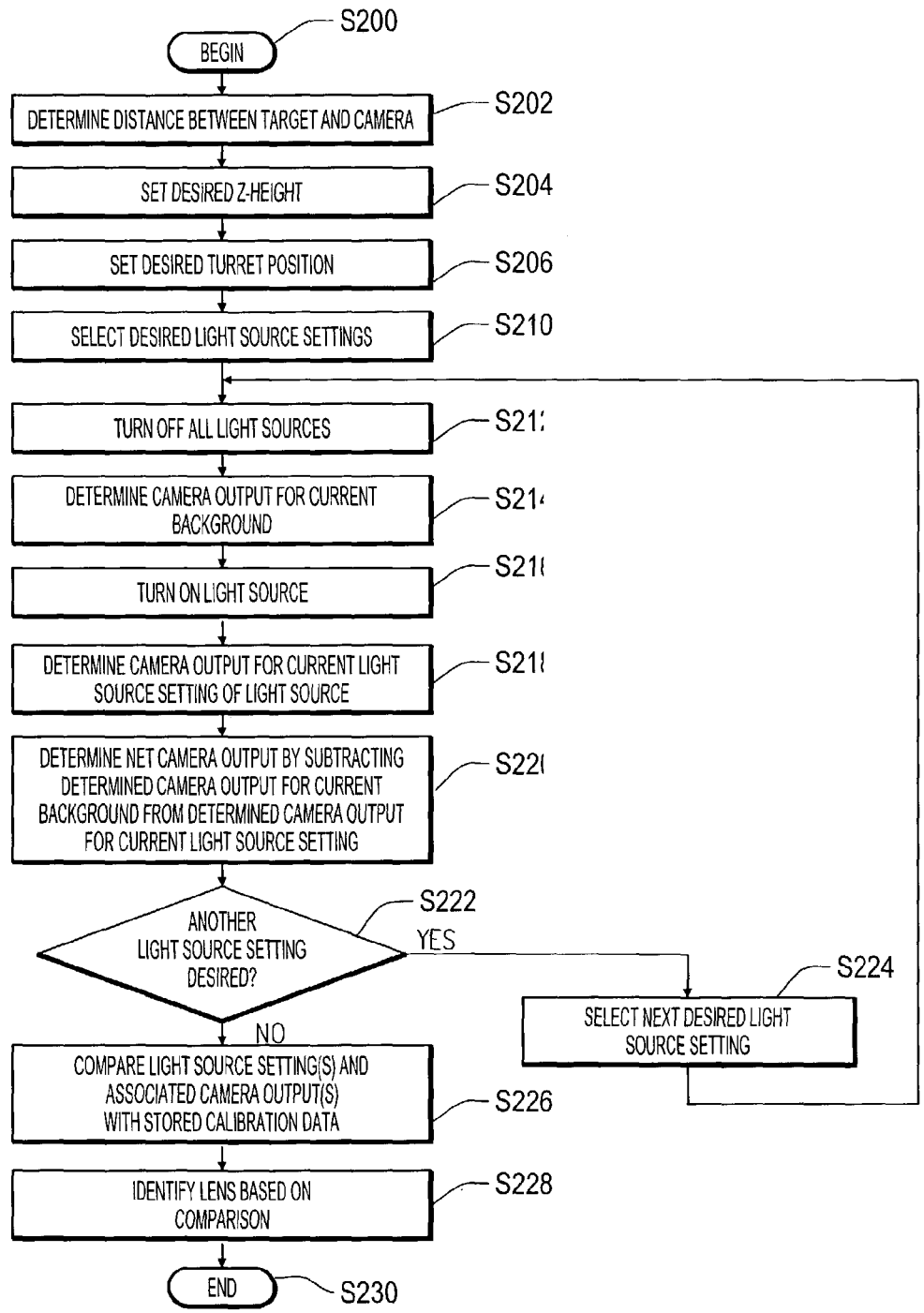
FIG. 4 is a flowchart outlining a first exemplary embodiment of a method for identifying a lens according to the invention.
Figure 5:
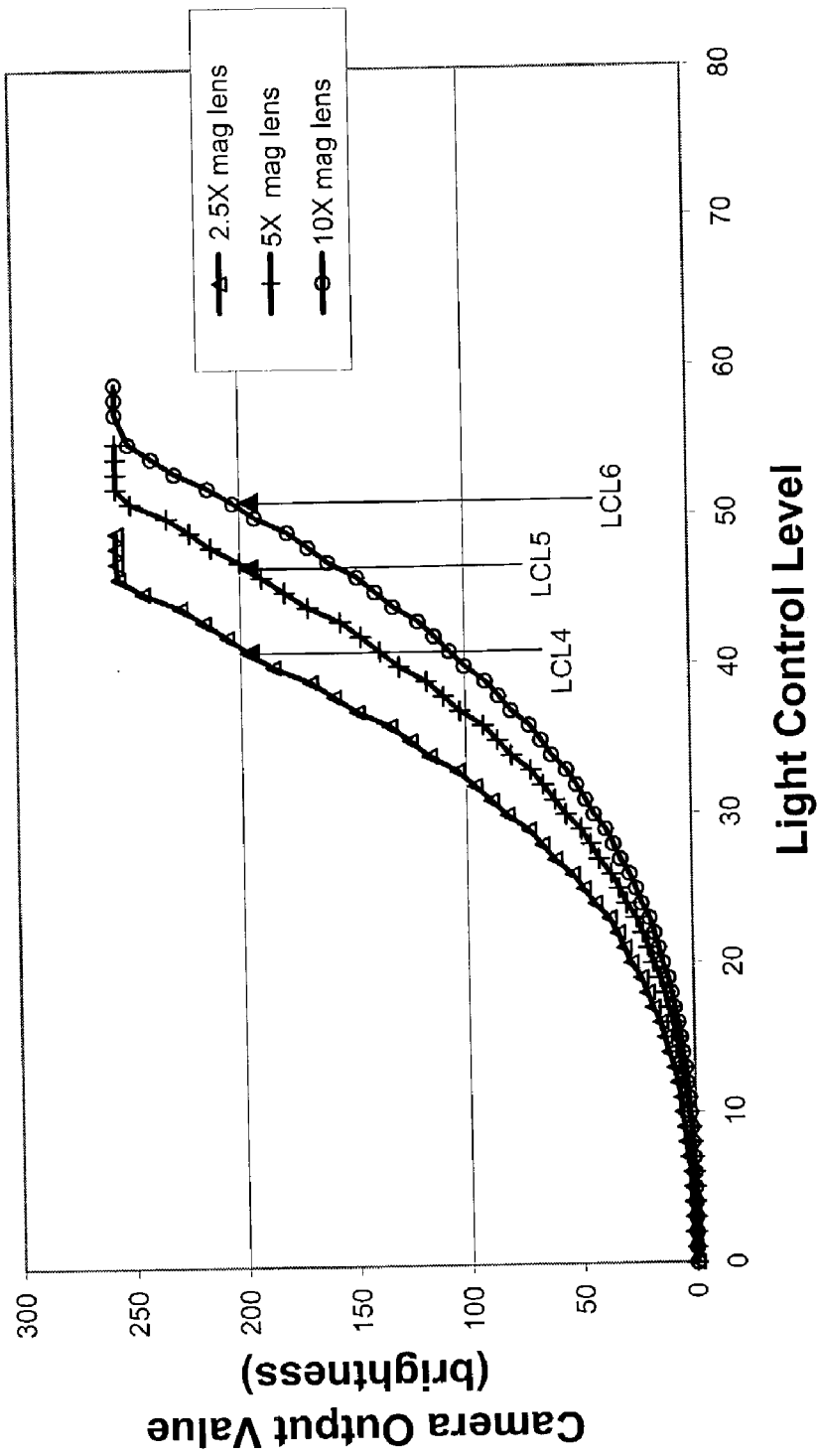
FIG. 5 is a second graph comparing lens identification calibration data for several light source settings with camera outputs for a plurality of lenses.

FIGS. 2–5 outline a first exemplary embodiment of a method for identifying a lens used for a vision system according to this invention. FIG. 2 is a flowchart outlining a first exemplary embodiment for determining lens identification calibration data for a plurality of lenses with a plurality of light source settings. Determining lens identification calibration data for a lens is also referred to herein as "calibrating" the lens. FIG. 3 is a graph comparing the lens identification calibration data received with a plurality of lenses with a plurality of light source settings using a known target. FIG. 4 is a flowchart outlining a first exemplary embodiment of a method for identifying a lens according to this invention. FIG. 5 is a graph comparing the lens identification calibration data received with a plurality of light sources settings without using a separate target.

For the first exemplary embodiment, the vision system light source that is being used is a stable, calibrated light source. That is, the light source reliably produces the same illumination intensity for a particular input light control level over long periods of time, due to the particular design and/or calibration procedures used for that light source. Such light sources are increasingly available in commercial machine vision systems. A related system is described in U.S. Pat. No. 6,239,554, which is incorporated herein by reference in its entirety. The camera is similarly stable and/or calibrated. Thus, for a given reference configuration on a particular machine having an associated lens set with associated lens identification calibration data, ideally only a single light source setting and an associated camera output is sufficient to identify a lens.

If a turret lens assembly, such as the turret lens assembly 400, is included in the vision machine, then only one turret lens position is required to be used, and that position can be considered one element of the reference configuration. A plurality of light source settings and/or a plurality of turret lens positions is not required, although that data could be gathered, because the stable, calibrated light source outputs a well known energy or intensity, and the corresponding camera output should in that case vary only as a function of the light transfer characteristic of the lens to be identified. Once the calibrated data is obtained, to identify the lens, the user only has to use one desired light source setting and reference configuration, determine the camera output at that light source setting and reference configuration, and then compare the camera output at the desired light source setting and reference configuration with the corresponding stored lens identification calibration data.

FIG. 2 is a flowchart outlining one exemplary embodiment of a method for calibrating a plurality of lenses using a plurality of light source settings for the reference configuration light source at one reference configuration turret lens position according to this invention. As shown in FIG. 2, operation of the method begins in step S100, and proceeds to step S102, where a lens to be calibrated is selected. Then, in step S104, a desired z-height is set. Operation then continues to step S106.

The z-height that is set is the reference configuration z-height. In various exemplary embodiments, the z-height is defined as the distance between the camera system and a stage. In various other exemplary embodiments, the z-height is the distance between the camera and a specific target. In various other exemplary embodiments, the z-height is simply the maximum z-height of the vision system. That is, the optical system, such as the optical assembly portion 205 including the lens to be identified, such as the lens 250, is sufficiently or fully retracted away from the stage 210 and any workpiece 20, as described in greater detail below.

It should be appreciated that, in various exemplary embodiments, the z-height is chosen such that limited or minor variations in the z-height have an insignificant effect on the lens identification procedure and results. In particular, such z-height configurations tend to insure that the minor z-height variations do not become a significant variable in the lens identification procedure. Thus, it should be appreciated that, in some exemplary embodiments, the z-height is any z-height in a defined range. In various other exemplary embodiments, the machine vision system may include an auto-focusing capability. In such cases, the reference configuration may also include auto-focusing each lens on the surface of a known target, or the like. That is, the Z-heights vary for various lenses, but are consistent for any single lens based on the Z-height established for that particular lens by the auto-focus operation.

More generally, the z-height can be any z-height that has been established to provide a satisfactory reference configuration that is usable both during lens identification calibration operations and when an unknown lens is to be identified. However, it should be appreciated that the procedure used to establish the z-height and, more generally, the entire reference configuration, should be usable for all lenses to be calibrated and/or identified on a particular vision machine.

In step S106, the current reference configuration light source control level setting is set to an initial value, for example, by the illumination power supply portion 191 shown in FIG. 1. Next, in step S108, all of the light sources are turned off. Then, in S110, the camera output is determined for the current background. The camera output for the current background is determined to compensate for background lights and other influences that affect the camera output independently of the light that is intended to be received from a particular light source during the calibration operations. Also, the variation in background light during the lens identification calibration and when identifying an unknown lens is compensated for by removing the camera output determined when the light sources are turned off. Operation then continues to step S112.

In step S112, the reference configuration light source is turned on. In various other exemplary embodiments, more than one reference configuration light source is turned on. However, it should be appreciated that the number of reference configuration light sources used to calibrate the lens is the same as the number of reference configuration light sources used when identifying the unknown lens. Next, in step S114, the camera output for the current light source setting of the reference configuration light source is determined. Then, in step S116, a net camera output is determined. The net camera output is determined by subtracting the determined camera output for the current background, obtained in step S110, from the determined camera output for the current reference configuration light source settings, determined in step S114. Operation then continues to step S118.

In step S118, the current light source setting and determined net camera output for the selected lens is stored in any convenient form, such as a look-up table, or the like. Then, in step S120, a determination is made whether the camera output or light source setting is greater than a desired maximum value. The light source setting is greater than the desired maximum value at least when the light source setting has either been fully turned on or set to a maximum desired value. The camera output is greater than the desired maximum value at least when the camera output reaches a maximum value corresponding to saturation. Thus, further increases in the light source setting are not required, as any further increases in the light source setting would not result in a different camera output. If at least one of the camera output and light source setting is not greater than the desired maximum value, the operation proceeds to step S122. Otherwise, the operation continues to step S124.

In step S122, the current light source setting is increased by an incremental value. Operation then returns to step S108. In contrast, in step S124, a determination is made whether all of the lenses have been calibrated. If not all the lenses have been calibrated, operation returns to step S102. Otherwise, operation continues to step S126, where operation of the method ends.

FIG. 3 is a graph comparing one exemplary set of the stored light source settings and determined associated net camera outputs for selected lenses that can be obtained by using the method outlined in FIG. 2. As shown in FIG. 3, the camera output (i.e., brightness) for a respective light source control level setting varies for each lens. In particular, FIG. 3 shows results for a set of 1×, 2.5× and 5× lenses, where the reference configuration includes using a coaxial light source and a known external target positioned in the field of view. For the results shown in FIG. 3, the machine vision system includes an auto-focusing capability, and the reference configuration includes auto-focusing each lens on the surface of the known target. In such cases, in various exemplary embodiments, a known target may be implemented as a feature durably assembled to, or include in, the stage 210, such that it can be repeatably positioned in the field of view of the vision system.

It should be appreciated, from FIG. 3, that with a light source setting that is less than a predetermined value, the results for various lenses are practically indistinguishable. Furthermore, it should be appreciated that the camera output for each of the lens saturates at the same predetermined camera output. Thus, when determining a light source setting to be used when identifying an unknown lens, a light source setting that emits a camera output that is greater than a minimum light source setting such that there is a measurable difference in the camera output for the various lenses should be used. Likewise, a light source setting which is less than the saturation value should be used, so that two or more lenses can be reliably distinguished based on a relationship between the light control level and the camera output value that is characteristic of each lens. For example, as shown in FIG. 3, at the brightness level 200 the corresponding light control levels $LCL_1$, $LCL_2$, and $LCL_3$ readily distinguish the different 1×, 2.5× and 5× lenses, respectively.

It should be appreciated that lens calibration curves similar to those shown in FIG. 3 can be obtained for a variety of other reference configurations. For example, in one exemplary reference configuration, a stage light, such as the stage light 220, provides illumination through the central transparent portion 212, shown in FIG. 1. In such exemplary reference configurations, the z-height includes full or sufficient retraction of the optical assembly portion 205 away from the stage 210.

It should be appreciated that, in some exemplary embodiments, "sufficient retraction" or "sufficient defocusing" means that the optical assembly portion 205 is retracted away from the stage 210 until the camera output does not appreciably decrease due to further retraction or defocusing. It should be appreciated that this condition approximately corresponds to only ambient light reaching the camera through the lens to be identified. Stated another way, this condition approximately corresponds to diminishing the effects of the stage 210 and/or workpiece 20 to insignificance for the purposed of lens identification. It should be appreciated that, for a given vision system, full retraction or full defocusing is the best that can be done in this regard. However, for various vision systems, less than full retraction or defocusing may be sufficient.

In a second exemplary reference configuration, a coaxial light, such as the coaxial light 230 shown in FIG. 1, provides the illumination, and the z-height includes full or sufficient retraction of the optical assembly portion 205 away from the stage 210. In each case, distinguishable lens calibration curves are obtained, similar to those shown in FIG. 3.

It should be appreciated that, in various exemplary embodiments, the lens calibration data need not cover as broad a range of brightness values as the curves shown in FIG. 3. In various exemplary embodiments, a smaller range of brightness values and light control level combinations, or even a single brightness value and light control level combination from each curve, are usable, provided that the range or values from each curve provide a distinguishable results for the various lenses to be identified. Thus, it should be appreciated that a great variety of possible lens identification calibration data sets and identification techniques are possible. Accordingly, it should be appreciated that the related description outlined above and below is exemplary and explanatory only, and not limiting in various exemplary embodiments according to this invention.

FIG. 4 is a flowchart outlining a first exemplary embodiment of a method for identifying a lens to be identified attached to a vision system according to this invention when the lenses have been calibrated for that vision system. The method of identifying the lens to be identified attached to the vision system utilizes the lens identification calibration data previously obtained using, for example, the method of FIG. 2. In performing the lens identifying method outlined in FIG. 4, the reference configuration z-height used to obtain the lens identification data should be the z-height used when identifying the lens. In the lens determining method outlined in FIG. 4, the camera output for a desired reference configuration light source setting is determined. Thereafter, the determined output for the desired reference configuration light source setting is compared to the stored lens identification calibration data to identify the lens currently attached to the vision system.

As shown in FIG. 4, operation of the method starts in step S200, and proceeds to step S202, where, when a specific reference configuration target is provided in the nominal field of the vision system, the distance between the target and the camera is determined. The target, as discussed above, should be the same reference configuration target as that used when the lens identification calibration data was obtained. It should be appreciated that, in various exemplary embodiments according to this invention, a specific "external" target need not be used. In such exemplary embodiments, step S202 may be omitted. Then, in step S204, the desired reference configuration z-height is set. The desired z-height set should be the same z-height as that used when the lens identification calibration data was obtained. Then, in step S206, the desired turret position is set. In exemplary embodiments, step S206 may be omitted. Next, in step S210, a desired reference configuration light source reference configuration setting is selected. As discussed above, the desired reference configuration light source setting is generally more useful when it is greater than a minimum light source setting where there is no significant measurable difference in camera outputs for various lenses. The desired light source setting is also generally more useful when it is less than a predetermined value that results in a saturated camera output, so that two or more lenses do not have the same maximum camera output. Operation then continues to step S212.

In step S212, all light sources are turned off. Then, in step S214, the camera output for the current background is determined. Next, in step S216, the reference configuration light source is turned on. It should be appreciated that the same reference configuration light source that was used to generate the lens identification calibration data should be used in step S216. Then, in step S218, the camera output for the current light source setting of the reference configuration light source is determined. Operation then continues to step S220.

In step S220, the net camera output is determined, by subtracting the determined camera output for the current background, determined in step S214, from the determined camera output for the current light source setting, determined in step S218. Then, in step S222, a determination is made whether another light source control level setting is desired. In various exemplary embodiments, the operator can select whether another reference configuration light source setting should be used to compare light source settings and associated camera outputs with stored lens identification calibration data. In various other embodiments, the selection can be made automatically. In various other embodiments, only a single light source control level setting is used. It should be appreciated that, in various exemplary embodiments where more light control level points are selected, corresponding to more points on a graph shown in FIG. 3, for example, the more reliable the lens identification may become. If another light source setting is desired, operation proceeds to step S224. Otherwise, operation continues to step S226.

In step S224, the next desired light source setting is selected. Operation then returns to step S212. In contrast, in step S226, the reference configuration light source settings and associated camera outputs are compared with the previously-determined stored lens identification calibration data. Then, in step S228, the operational lens to be identified is identified based on the comparison. Operation then continues to step S230, where operation of the method ends.

FIG. 5 illustrates a second graph that compares a second exemplary set of stored light settings and determined net camera outputs for selected lenses using a different reference configuration. As shown in FIG. 5, similarly to FIG. 3, the camera output (i.e., brightness) for a respective light source control level setting varies for each lens. In particular, FIG. 5 shows results for a set of 2.5×, 5× and 10× lenses, where the reference configuration includes using no external target, an arbitrary object positioned in the nominal field of view, and full or at least sufficient retraction of the optical system along the z-axis away from any object positioned in the nominal field of view. Under such conditions, the curves shown in FIG. 5 are representative of the results obtained using a stage light. If a stage light is included in the reference configuration, then a particular X-Y position of the stage should be included in the reference configuration.

The curves shown in FIG. 5 are also representative of the results obtained using a coaxial light when the optical system is sufficiently or fully retracted along the z-axis away from any object positioned in the nominal field of view. It should be appreciated that, in such sufficiently-or fully-retracted "coaxial" exemplary embodiments, the coaxial light received by the camera is primarily light that has been reflected and/or backscattered from the lens to be identified itself. The inventors have determined that such reflected and/or backscattered light provides a highly individual and repeatable light transfer characteristic that is usable to identify various lenses. Thus, such a characteristic is usable in various exemplary embodiments according to this invention. Furthermore, when using this lens characteristic with coaxial lighting, both lens calibration and lens identification can be performed simply by retracting the lens. That is, in various exemplary embodiments, it is not necessary to remove a workpiece or to reposition the stage to a particular X-Y location. Furthermore, no particular "external" target or surface needs to be provided. All of these features are advantageous in various exemplary embodiments according to this invention.

For the curves shown in FIG. 5, similarly to the curves shown in FIG. 3, at sufficient brightness levels, such as, for example, the brightness level 200, the corresponding light control levels $LCL_4$, $LCL_5$, and $LCL_6$ readily distinguish the different 2.5×, 5× and 10× lenses, respectively.

Figure 6:
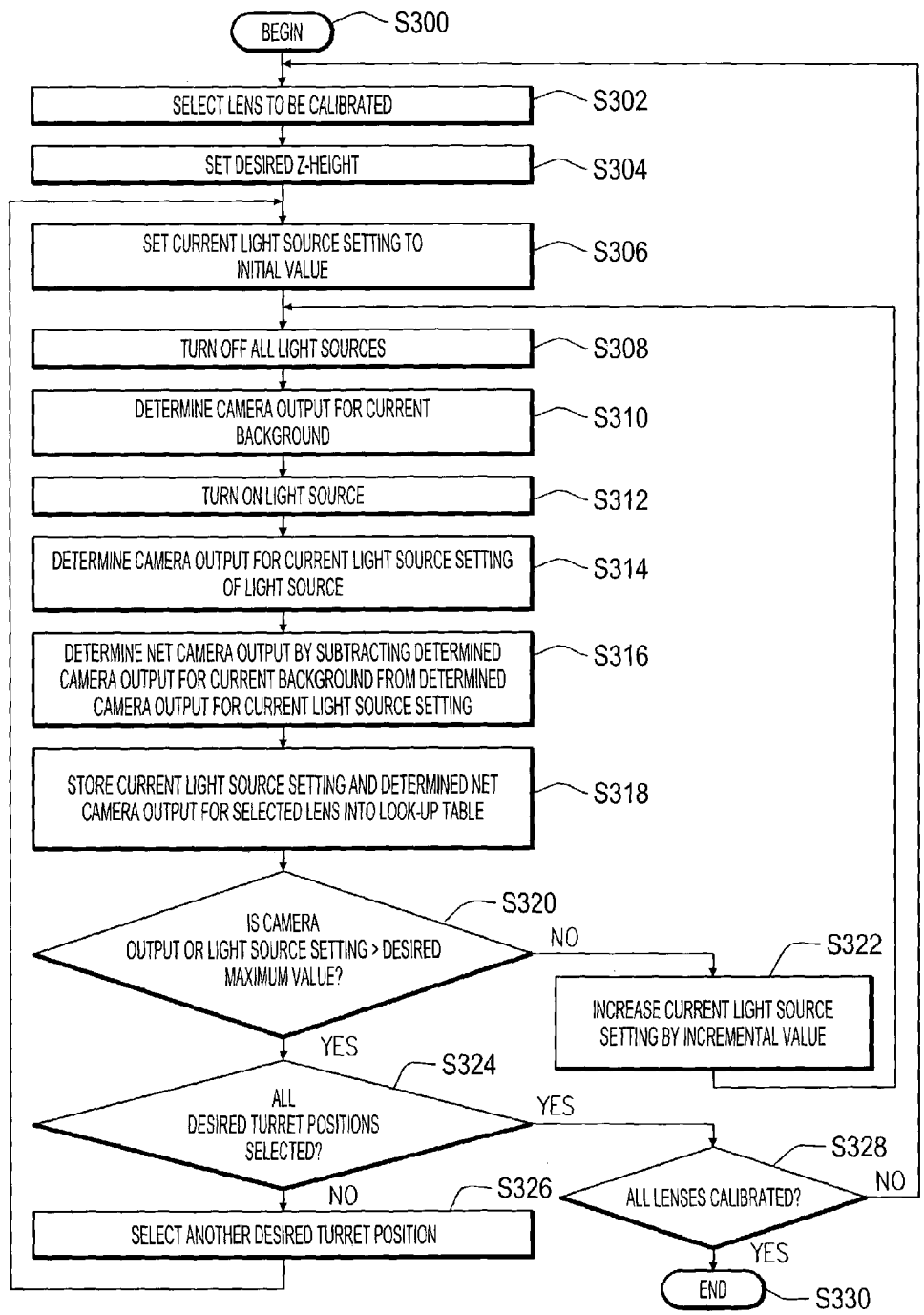
FIG. 6 is a flowchart outlining a second exemplary embodiment of a method for determining lens identification calibration data for several light source settings and turret lens positions with camera outputs according to this invention.
Figure 7:
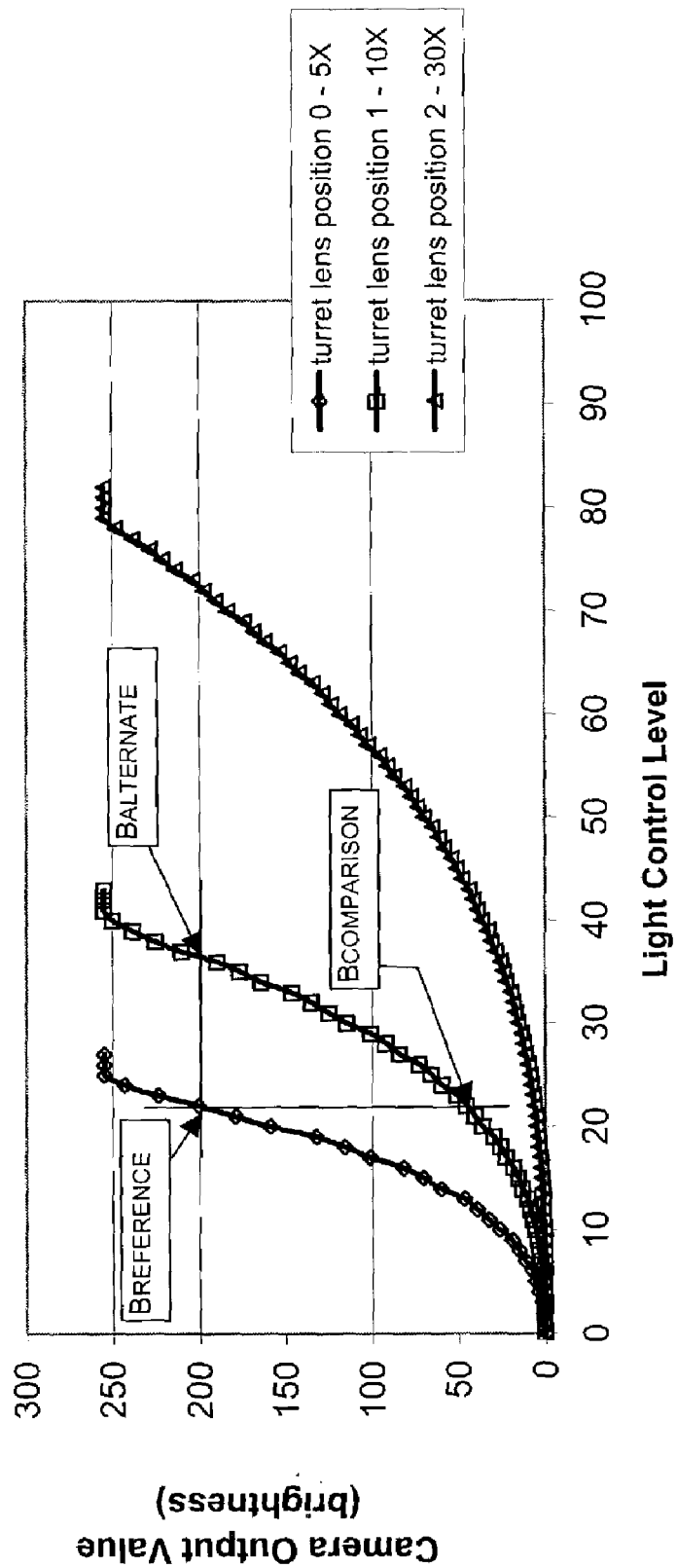
FIG. 7 is a third graph comparing lens identification calibration data for several light source settings with camera outputs for a single lens with a plurality of turret lens positions.
Figure 8:
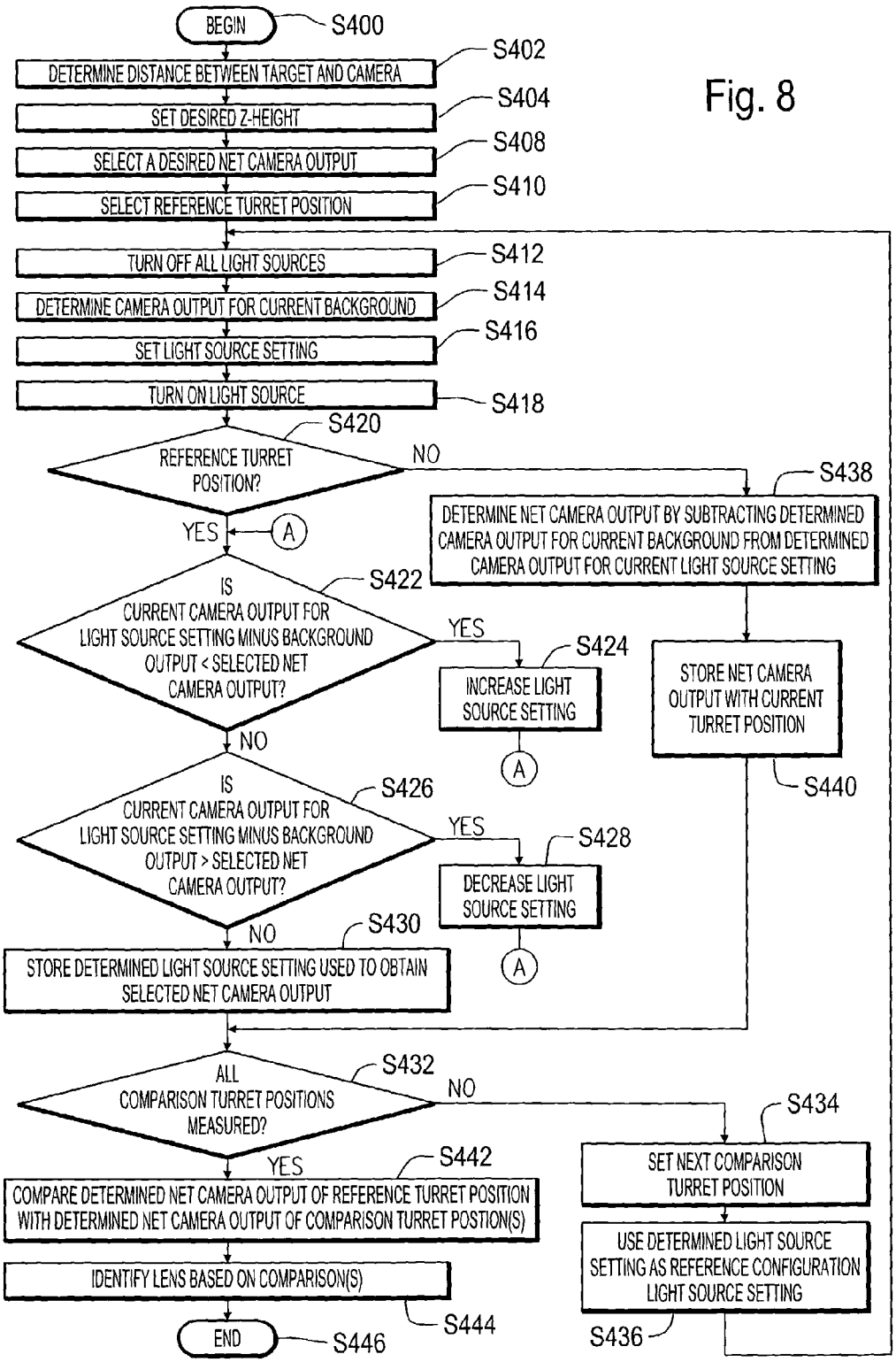
FIG. 8 is a flowchart outlining a second exemplary embodiment of a method for identifying a lens according to the invention.

FIGS. 6–8 outline a second exemplary embodiment of a method for identifying a lens used for a vision system according to this invention. FIG. 6 is a flowchart outlining a second exemplary embodiment for calibrating a plurality of lenses using a plurality of light source settings for the reference configuration light source with a plurality of reference configuration turret lens positions according to this invention. FIG. 7 is a graph comparing the lens identification calibration data from a plurality of turret lens positions for one lens for a plurality of reference configuration light source control level settings. FIG. 8 is a flowchart outlining a second exemplary embodiment of a method for identifying an unknown lens according to this invention.

Unlike the first exemplary embodiment, the light source used in the second exemplary embodiments does not need to be a stable, calibrated light source. Thus, a camera output for a given light source control level setting using one turret lens position does not need to remain stable over long periods of time. In general, the light source needs to remain stable only during the short term, over which the calibrations operations using the reference configurations for a particular lens occur. Similarly, at a later time, the camera output for a given light source control level setting only needs to remain stable for the short term over which the identification operations using the reference configurations for a particular lens occur.

Thus, this second exemplary embodiment requires a variable element, such as the turret lens assembly 400, or the like, but does not require a calibrated, or long-term stable, light source and/or camera. However, the proportion by which the camera output increases or decreases for a plurality of turret lens positions should remain stable for any one lens, as discussed in greater detail below, with reference to FIG. 7. In this exemplary embodiment to identify a lens, the camera outputs for at least two turret lens positions using the same light source setting are measured and compared with the stored lens identification calibration data. Such a method is insensitive to reasonably expected long term variations in the light source output relative to a given light control level command.

FIG. 6 is a flowchart outlining one exemplary embodiment of a method for calibrating a plurality of lenses using a plurality of light source settings for the reference configuration light source at a plurality of reference configuration turret lens positions according to this invention. It should be appreciated that, when a plurality of reference configuration turrets positions are included in a reference configuration, the reference configuration includes a first respective state and a first respective corresponding camera output corresponding to the first respective turret lens position, a second respective state and a second respective corresponding camera output corresponding to the second respective turret lens position, and so on, for any additional respective reference configuration turret lens positions.

As shown in FIG. 6, operation of the method begins in step S300, and proceeds to step S302, where a lens to be calibrated is selected. Then, in step S304, a desired z-height is set, according to the principles previously described. As previously described, the z-height can be any z-height that has been established to provide a satisfactory reference configuration that is usable both during lens identification calibration operations and when an unknown lens is to be identified. Operation then continues to step S306.

In step S306, the current light source setting is set to an initial value. Next, in step S308, all of the light sources are turned off. Then, in S310, the camera output is determined for the current background. The camera output for the current background is determined to compensate for background lights and other influences which affect the camera output independently of the light that is intended to be received from a particular light source during the calibration operations, as previously described. Operation then continues to step S312.

In step S312, the reference configuration light source is turned on. In various other exemplary embodiments, more than one reference configuration light source is turned on. However, it should be appreciated that the number of reference configuration light sources used to calibrate the lens should be the same as the number of reference configuration light sources used when identifying the lens that is used. Next, in step S314, the camera output for the one or more current light source setting(s) of the reference configuration light source(s) is determined. Then, in step S316, a net camera output is determined. The net camera output is determined by subtracting the determined camera output for the current background, obtained in step S310, from the determined camera output for the one or more current light source setting(s), determined in step S314. Operation then continues to step S318.

In step S318, the current light source setting and determined net camera output for the selected lens are stored in any convenient form, such as, for example, into a look-up table. Then, in step S320, a determination is made whether the camera output and/or light source setting(s) is greater than a corresponding desired maximum value, as previously described with reference to step S120 shown in FIG. 2. If one or more of the camera output and the reference configuration light source(s) setting(s) is not greater than the appropriate desired maximum value, the operation proceeds to step S322. Otherwise, the operation continues to step S324.

In step S322, one or more of the current light control level(s) of the reference configuration light source(s) is altered by an incremental value. Operation then returns to step S308. In contrast, in step S324, a determination is made whether all of the desired reference configuration turret lens positions have been selected. If not all of the reference configuration turret lens positions have been selected, the operation proceeds to step S326. Otherwise, operation jumps to step S328. In step S326, another desired turret lens position is selected. Operation then returns to step S306. In contrast, in step S328, a determination is made whether all of the lenses have been calibrated. If not all the lenses have been calibrated, operation returns to step S302. Otherwise, operation continues to step S330, where operation of the method ends.

FIG. 7 is a graph comparing one exemplary set of the stored light source settings and determined associated camera outputs for a plurality of turret lens positions for an exemplary one of the lenses that can be obtained by using the method outlined in FIG. 6. That is, the family of curves shown in FIG. 7 corresponds to a plurality of reference configuration turret positions, for one of the lenses that is calibrated according to the method outlined in FIG. 6. As shown in FIG. 7, the camera output (i.e. the brightness) varies for each reference configuration turret lens position, for a single lens. The inventors have determined that a ratio or combination of at least two respective camera outputs corresponding to respective turret lens positions for a reference configuration light control level provides a light transfer characteristic that is robustly unique for a particular lens. Alternatively, a ratio or combination of at least two respective light control levels corresponding to respective turret lens positions for a reference configuration camera output provides a light transfer characteristic that is similarly robustly unique for a particular lens. Thus, such "combination characteristics" reliably distinguish a wide variety of lenses.

In one exemplary embodiment, a simple ratio provides such a combination characteristic. For example, as shown in FIG. 7, at a point $B_{REFERENCE}$ on the lens calibration data curve corresponding to turret lens position 0, the camera output values is 200 units. The turret lens position "0" is herein referred to as a "reference turret position", since the point $B_{REF}$ is associated with the reference level camera output of 200 units on the curve corresponding to that turret position. The corresponding light control level of approximately 21 units is then taken as the reference configuration light control level in this example. The point $B_{COMPARISON}$ on the lens calibration data curve corresponding to the turret lens position "1" corresponding the same reference configuration light control level of approximately 21 units. A ratio of the camera output values $B_{COMPARISON}$ and $B_{REFERENCE}$, provides one exemplary "combination characteristic" that reliably distinguishes a wide variety of lenses.

It should be appreciated that a ratio of light control levels associated with the points $B_{ALTERNATE}$ and $B_{REFERENCE}$ could be established by steps analogous to those outlined immediately above, and such a ratio is also usable as a combination characteristic that reliable distinguishes a wide variety of lenses.

FIG. 8 is a flowchart outlining a second exemplary embodiment of a method for identifying a lens to be identified that is attached to a vision system according to this invention when the lenses have been calibrated using at least two reference configuration turret lens positions as described above with reference to FIGS. 6 & 7. Such a method can be used when a light source is not calibrated and or stable over the long term. The at least two reference configuration turret lens positions include a "reference" turret lens position, which in various exemplary embodiment is used to establish the reference configuration light control level, and a "comparison" turret lens position that provides a second camera output according to the reference configuration light control level.

As shown in FIG. 8, operation of the method starts at step S400, and proceeds to step S402, where the distance between the target and the camera is determined. The target, as discussed above, should be the same target as that used when the lens identification calibration data was obtained. It should be appreciated that, in various exemplary embodiments according to this invention, a specific "external" target is not used for the reference configuration, as previously described. For example, in various exemplary embodiments, the coaxial light source is used, and the reference configuration ensures that the light transmitted from the light source to the camera is primarily the light reflected and/or backscattered from the lens to be identified, as previously described. In such exemplary embodiments, step S402 may be omitted. Then, in step S404, the desired z-height is set. The desired z-height set should be the same reference configuration z-height as that used when the lens identification calibration data was obtained. Operation then continues to step S408.

In step S408, the desired net camera output is selected. The desired net camera output is a prescribed reference configuration camera output associated with the "reference" turret lens position, as described below. In various exemplary embodiments, the desired net camera output is generally a relatively high camera output when the "reference" turret lens position is the one that provides the maximum output among the turret lens positions used in these lens identification operations. In such a case, the desired net camera output should be selected to be less that the saturation camera output by at least the value of the maximum background or ambient light value expected from the operations of step S414 below. The camera output value 200 associated with the point $B_{REFERENCE}$, previously described with reference to FIG. 7, provides one example of a desirable net camera output. Then, in step S410, the "reference" turret lens position is selected.

The selected "reference" turret lens position should be one of the turret lens positions that were used when the lens identification calibration data was obtained. In various exemplary embodiments, the "reference" turret lens position is the turret lens position with the lowest magnification. When the "reference" turret position is used to establish the reference configuration light control level, as described below with reference to steps S422–S430, it is advantageous when the selected "reference" turret lens position is the turret lens position that produces the highest camera value output for all lenses to be identified. When such a turret lens position is chosen as the "reference" turret lens position, then it is not possible for a later-chosen "comparison" turret lens position to cause a saturated camera output. However, provided that camera saturation is avoided for all reference configuration turret lens positions, it should be appreciated that the "reference" turret lens position can be at any position included in the lens identification calibration data that can be used to set a reference configuration light level that is usable with a second "comparison" turret lens position according to the systems and methods of this invention, as described above and below.

In any case, it should be appreciated that a particular "reference" turret lens position is used in the operations described with reference to steps S422–S430 below to actively determine the reference configuration light control level according to the desired net camera output shown in step S408. By actively determining the reference configuration light control level in this way, the results obtained in the following operations of this exemplary method are compensated or "normalized" so that the final lens identification results are substantially insensitive to the light source variations associated with uncalibrated and/or unstable light sources. Next, in step S412, all light sources are turned off. Then, in step S414, the camera output for the current background is determined. Operation then continues to step S416.

In step S416, the initial or current light source setting is set. When operation first proceeds to step S416, the current light source setting has not been set. Thus, the initial light source setting is set when the operation first proceeds to step S416. Then, in step S418, the light source is turned on. It should be appreciated that the same reference configuration light source(s) used when the lens identification calibration data was obtained is the reference configuration light source turned on in step S418. Next, in step S420, a determination is made whether the current turret lens position is the "reference" turret lens position. It should be appreciated that the initial turret lens position is the "reference" turret lens position. If the current turret lens position is the "reference" turret lens position, the operation proceeds to step S422. Otherwise, operation continues to step S438.

In step S422, a determination is made whether the current camera output for the current light source setting minus the background output is less than the selected desired net camera output. As previously described, this background output subtraction tends to make this method insensitive to ambient light variations. If the current camera output for the current light source setting minus the background output is less than the desired net camera output, the operation proceeds to step S424. In step S424, one or more of the reference configuration light source(s) setting is adjusted. The operation then returns to step S422. Otherwise, operation continues from step S422 to step S426.

In contrast, in step S426, a determination is made whether the current camera output for the current light source setting minus the background output is more than the desired net camera output. If the current camera output for the current light source setting minus the background output is more than the selected net camera output, the operation proceeds to step S428. Otherwise, operation proceeds to step S430. In step S428, at least one of the reference configuration light source(s) setting is decreased. The operation thereafter returns to step S422.

It should be appreciated that, in reaching step S430, the previous steps, in particular steps S422–S428, have determined the reference configuration light source(s) setting that achieves the desired net camera output. It should be appreciated that there are many alternative efficient techniques for determining the reference configuration light source(s) setting that achieves the desired net camera output that can be used in place of the exemplary techniques described above in the various exemplary embodiments of the methods described herein. Such techniques include binary searches and the like. In various exemplary embodiments, the current camera output for the light source setting minus background output can be within a predetermined range of the desired net camera output, rather than precisely equal to the selected net camera output. In step S430, the reference configuration light source setting(s) or light control level(s) is stored and/or maintained as the reference configuration light control level for various subsequent operations. Operation then continues to step S432.

In step S432, a determination is made whether all "comparison" turret lens positions have been measured. The comparison turret lens positions include at least one, if not all, of the turret lens positions included in the lens identification calibration data, except for the turret lens position used as the "reference" turret lens position. In various exemplary embodiments, a single "comparison" turret lens position is used. If not all the desired comparison turret lens positions have been measured, operation proceeds to step S434. Otherwise, operation continues to step S442.

In step S434, the next "comparison" turret lens position is set. The first time that step S434 is reached, this will be the initial "comparison" turret lens position. Then, in step S436, the reference configuration light source setting, saved in step S430, is designated to be used as the light source setting in the following light source setting operation(s). Operation then returns to step S412.

In step S412, all light sources are turned off. Then, in step S414, a new current background camera value is taken to compensate for the respective amount of ambient light that is transferred to camera when using the current respective turret lens position. Next, in step S416 the light source setting designated in step S436 is set. Operation then continues to step S418.

In step S418, the reference configuration light source(s) is turned on. Next, in step S420, the "comparison" turret position causes operation to continue to step S438. In step S438, when the "comparison" turret lens position is being used, the net camera output for the one or more current light source setting(s) is determined by subtracting the camera output for the current background from the determined camera output for the current determined reference configuration light source setting. Then, in step S440, the net camera output for the current "comparison" turret lens position is stored. Operation then continues to step S442.

In step S442, after all "comparison" turret lens positions have been measured, a relationship for the determined net camera output of the "reference" turret lens position relative to the determined net camera output(s) of the "comparison" turret lens position(s) is compared with that same relationship for the previously stored lens identification calibration data for the various lenses. Then, in step S444, the current lens to be identified in the vision system is identified based on the comparison. As previously described, in various exemplary embodiments, the relationship is simply a ratio between the outputs of the "reference" and "comparison" turret lens positions. Operation then continues to step S446, where the method ends.

Figure 9:
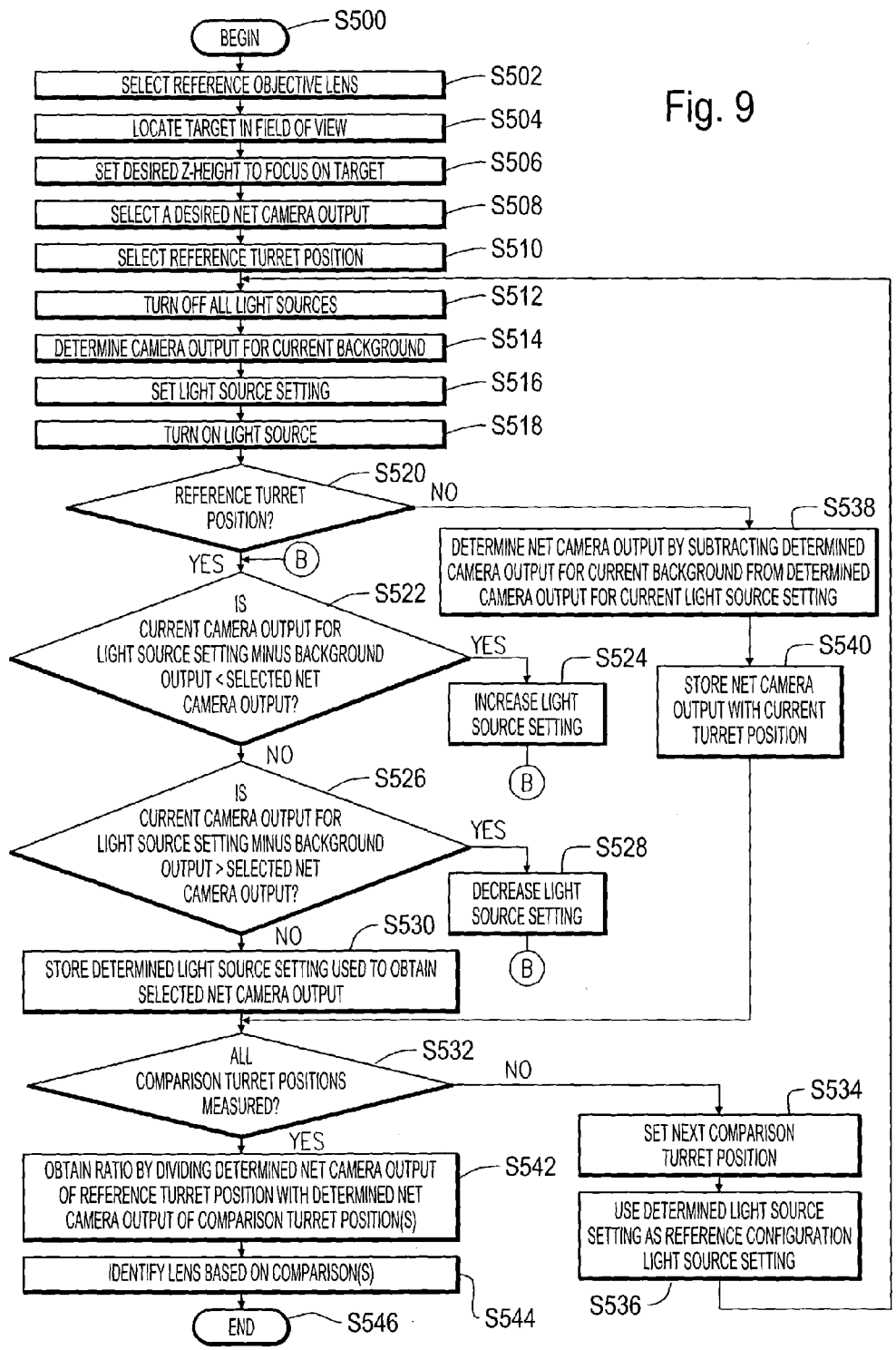
FIG. 9 is a flowchart outlining a first exemplary embodiment of a method of determining respective attenuation ratios with respective turret lens positions for a plurality of vision systems according to this invention.
Figure 10:
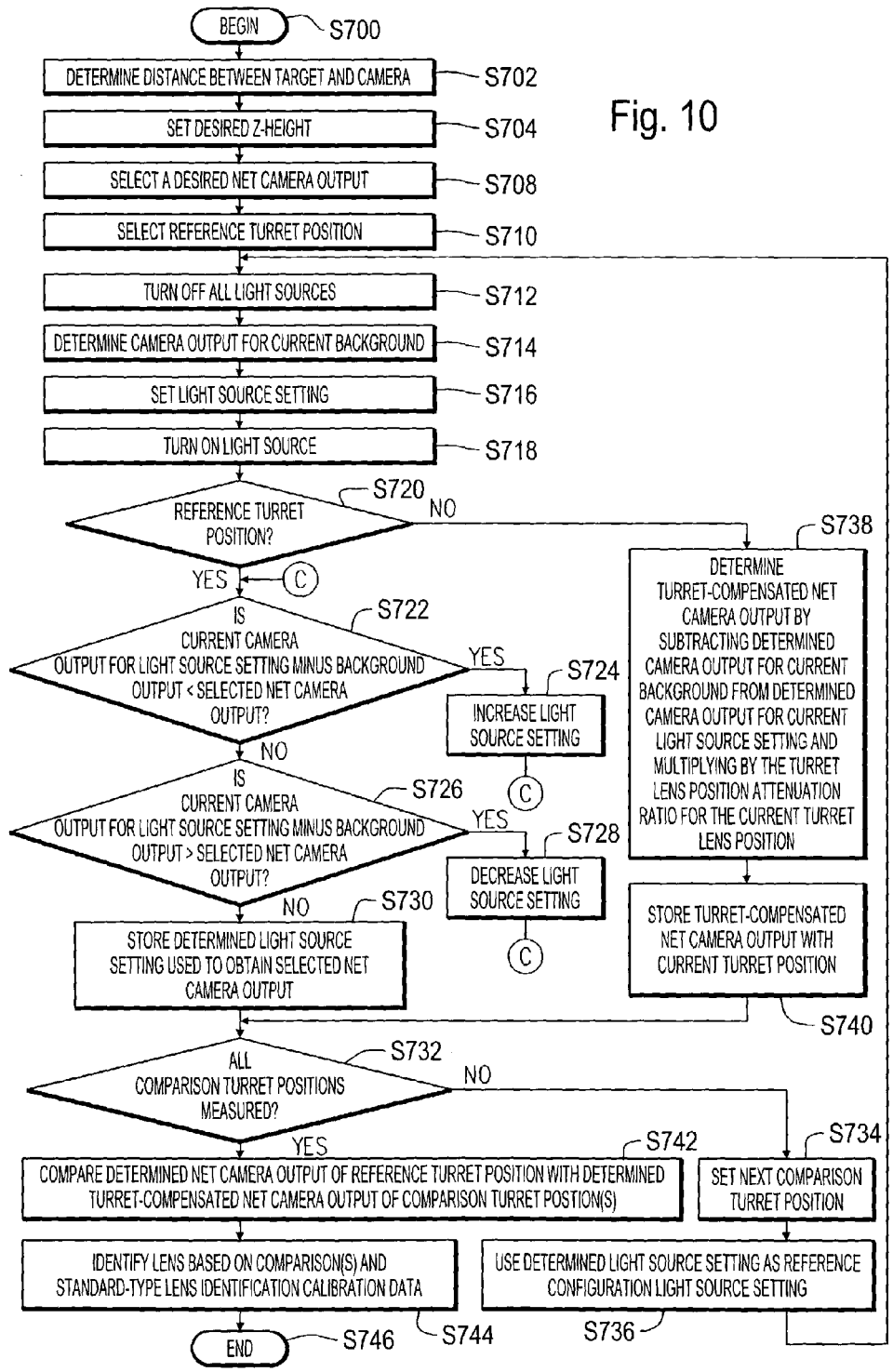
FIG. 10 is a flowchart outlining a third exemplary embodiment of a method for identifying a lens according to this invention.

FIGS. 9 and 10 outline a third exemplary embodiment of a method for identifying a lens used for a vision system according to this invention. Like the second exemplary embodiment, the light source used in the third exemplary embodiments does not need to be a stable, calibrated light source. However, it is one objective of the third exemplary embodiment to be able to use a standard set of lenses and a standard set of lens identification calibration data with different types of vision system machines. Thus, another standardization process is necessary in order to compensate or "normalize" for variations that occur between different types of vision system machines. In particular, in the exemplary embodiment shown in FIGS. 9 and 10, this additional standardization compensates for the differences in optical attenuation that occur between the different turret lens assemblies and various other optical path elements in different type of vision machines.

It should be appreciated from the description of the systems and methods outlined above that, in various exemplary embodiments according to this invention, it is important to perform lens identification operations using the same reference configuration that is used when acquiring the lens identification calibration data that is used for the lens identification. It should be appreciated further that the inherently different physical configurations of two different vision machine types, one hereafter called a particular or current machine type and the other hereafter called a chosen standard machine type, effectively prevents providing a matching reference configuration between the two types of machines.

However, it is convenient in a number of practical applications to be able to use a standard set of lenses and a standard set of lens identification calibration data with different types of vision system machines. For example, various manufacturers may have different sizes of similar machines, or different product families of machines that are at least roughly comparable in design. In such cases, the inventors have determined that, in various exemplary embodiments according to this invention, the results of lens identification operations on a different particular machine type using a particular machine reference configuration can be made comparable to the lens identification calibration data obtained on a chosen standard machine type using a standard machine reference configuration, as outlined in greater detail below.

FIG. 9 is a flowchart outlining a first exemplary embodiment of a method for determining a set of machine type-specific turret lens position attenuation ratios that are characteristic of a particular machine type. Of course, the same method is also usable to establish the attenuation ratios of the chosen standard machine type. The attenuation ratios characterize the inherent light transfer characteristics of the particular machine's turret lenses in combination with various other optical path elements. Thus, differences between the inherent light transfer characteristics of the particular machine type and the chosen standard machine type are reflected in their respective attenuation ratios. Thus, two different machine types can be characterized for their light transfer characteristics that are independent of the light transfer characteristics of the lens to be identified. Thus, such differences in their inherent light transfer characteristics can be effectively compensated and/or removed as a variable that affects lens identification operations according to this invention. Thus, the light transfer characteristics of a lens to be identified on a particular machine type can be compared to the lens identification calibration data obtained using the chosen standard machine type in order to identify the lens.

As shown in FIG. 9, operation of the method begins at step S500 and proceeds to S502, where a reference configuration objective lens is selected and installed where various lenses to be identified are normally installed. In various exemplary embodiments, the reference objective lens is a lens that has a minimum effect on the camera output for a reference turret lens position and comparison turret lens position. Then, in step S504, a target in the field of view is located. In one exemplary embodiment, the target is a surface of the stage. In another exemplary embodiment, the target is a specific featureless target, such a diffusely reflecting surface with high reflectance positioned on the stage. Next, in step S506, a desired z-height between the camera system and the target is set. In particular, in various exemplary embodiments, this desired z-height is the height that provides a focused image of the target surface. Operation then continues to step S508.

In step S508, the desired net camera output is selected. The desired net camera output is a prescribed reference configuration camera output associated with the "reference" turret lens position, as described below. The desired net camera output is chosen as previously described with reference to step S408, shown in FIG. 8. However, for the purposes of the "machine-to-machine standardization" method shown in FIG. 9, in various exemplary embodiments, the desired net camera output used in step S508 is the same each time the method is used on a chosen standard machine type and a particular machine type. In such embodiments, the reference configuration light control level is set for each type of machine to a level the produces the same camera output value for the "reference" turret lens position on each type of machine.

Steps S510 to S540 of FIG. 9 corresponds to steps S410 to S440 of FIG. 8. In these steps, a determined net camera output of a reference turret lens position and a net camera output of comparison turret lens positions is obtained. Thus, an explanation of these steps will be omitted. The only significant difference between the operations of steps S410 to S440 of FIG. 8 and steps S510 to S540 of FIG. 9, is that steps S510 to S540 are performed with the vision machine focused on an external target surface in the present method. The inventors have determined that this is one exemplary procedure that provides turret lens position attenuation ratios that reliably reflect the inherent light transfer characteristics of various vision machines that are independent of the light transfer characteristics of the lens to be identified, as previously discussed.

In step S542, the turret lens position attenuation ratios for the current machine are obtained. The turret lens position attenuation ratios can be used to compensate for the varying outputs for various vision system machine types, as outlined above. Each turret lens position attenuation ratio is obtained by dividing the determined net camera output of the reference turret lens position with the determined net camera output of one or more comparison turret lens positions. Next, in step S544, each respective attenuation ratio with each respective turret lens position is stored. Operation then continues to step S546, where the method ends.

FIG. 10 is a flowchart outlining a third exemplary embodiment of a method for identifying an unknown lens according to this invention. The third exemplary embodiment uses the turret lens position attenuation ratios of a current particular machine to compensate the camera output results of various lens identification operations on that particular machine. The compensated results are properly comparable to a standard set of lens identification calibration data determined using the chosen standard machine.

Steps S700 to step S746 of FIG. 10 correspond to steps S400 to step S446 of FIG. 8, respectively. In these steps, a lens to be identified is identified based on a net camera output of a reference turret lens position and a net camera output of a comparison turret lens position that is compensated using the appropriate turret lens position attenuation ratio for the current particular vision machine. Thus, an explanation of these steps will be omitted except for the following points of emphasis.

As previously discussed with reference to step S508 shown in FIG. 9, in various exemplary embodiments the desired net camera output used in step S708 is the same as the desired net camera output used on the chosen standard machine type when determining the standard lens identification calibration data used to identify the lens to be identified in step S744.

In step S738, the net camera output is compensated for the turret lens position light transfer characteristics of the current particular machine by using the appropriate turret lens position attenuation ratio. That is, when the "comparison" turret lens position is being used, the "turret-compensated" net camera output for the one or more current light source setting(s) is determined by subtracting the camera output for the current background from the determined camera output for the current determined reference configuration light source setting and then multiplying this difference by the appropriate current turret lens position attenuation ratio. As previously discussed, this step effectively compensates, and/or removes as a variable, the inherent light transfer characteristics of the current particular machine type in comparison to the chosen standard machine type. Thus, the light transfer characteristics of a lens to be identified on this particular machine can be compared to the lens identification calibration data obtained using the chosen standard machine type in order to identify the lens.

In step S742, after all "comparison" turret lens positions have been measured and their turret-compensated net camera outputs determined, a relationship for the determined net camera output of the "reference" turret lens position relative to the determined turret-compensated net camera output(s) of the "comparison" turret lens position(s) is compared with that same relationship for the previously stored lens identification calibration data provided based on the chosen standard machine type and a lens set including the lens to be identified in the current particular machine. Then, in step S744, the current lens to be identified in the vision system is identified based on the comparison.

While this invention has been described in conjunction with the exemplary embodiments outlined above, it is evident that many alternatives, modifications and variations will be apparent to those skilled in the art. For example, it should be appreciated that the machine-to-machine standardization method described with reference to FIGS. 9 and 10, is an embodiment usable where the reference configuration light source available in the various different machine types is of the uncalibrated variety. It should be appreciated that analogous and simpler methods can be applied to achieve similar machine-to-machine standardization among different machines that each have a stable and calibrated reference configuration light source available. Accordingly, the exemplary embodiments of the invention, as set forth above, are intended to be illustrative, not limiting. Various changes may be made without departing from the spirit and scope of the invention.

What is claimed is:

1. A method for identifying a lens to be identified in a vision machine, the vision machine comprising:
    the lens to be identified;
    at least one controllable light source;
    a camera; and
    lens identification calibration data for a plurality of lenses, the lens identification calibration data for each of the plurality of lenses based on at least one respective light source level setting and at least one respective camera output obtained for that respective light source level setting, the method comprising:
    setting a light source level of the at least one controllable light source to provide a corresponding illumination;
    transferring the corresponding illumination to the camera using the lens to be identified;
    determining at least one camera output based on the transferred corresponding illumination;
    comparing data based on the at least one camera output and the at least one light source level with the lens identification calibration data; and
    identifying the lens to be identified based on the comparison.

2. The method of claim 1, wherein determining at least one camera output based on the transferred corresponding illumination comprises determining a net camera output.

3. The method of claim 2, wherein determining the net camera output comprises:

determining a first camera output when all light sources are turned off;

determining a second camera output when the at least one controllable light source provides the corresponding illumination; and determining the net camera output by subtracting the first camera output from the second camera output.

4. The method of claim 1, further comprising operating the vision machine in a state of a reference configuration while determining the at least one camera output.

5. The method of claim 4, wherein operating the vision machine in the state of the reference configuration comprises:

placing the vision machine into a reference configuration optical path arrangement; and activating at least one reference configuration light source as the at least one controllable light source that provides the corresponding illumination.

6. The method of claim 5, wherein:

activating the at least one reference configuration light source comprises activating at least one of a stage light, a surface light and a coaxial light; and placing the vision machine into the reference configuration optical path arrangement comprises placing the vision machine into an arrangement that provides a focused image of a surface in a nominal field of view.

7. The method of claim 6, wherein placing the vision machine into an arrangement that provides the focused image of the surface comprises at least one of providing a focused image of the surface of an element of the stage and providing a focused image of the surface of a target element.

8. The method of claim 5, wherein:

activating the at least one reference configuration light source comprises activating at least one of a stage light, a surface light and a coaxial light; and placing the vision machine into the reference configuration optical path arrangement comprises placing the vision machine into an arrangement that provides a sufficiently defocused image of a nominal field of view.

9. The method of claim 8, wherein activating the reference configuration light source comprises activating the coaxial light; and placing the vision machine into the reference configuration optical path arrangement comprises placing the vision machine into an arrangement that provides a sufficiently defocused image of a nominal field of view such that transferring the corresponding illumination to the camera using the lens to be identified comprises transferring, as a substantial portion of the corresponding illumination, back-reflected light from the lens to be identified.

10. The method of claim 4, wherein operating the vision machine in the state of the reference configuration comprises placing the vision machine into a reference configuration that at least substantially corresponds to a reference configuration that was used on a corresponding vision machine when the lens identification calibration data for each of the plurality of lenses was determined.

11. The method of claim 10, wherein placing the vision machine into the reference configuration that at least substantially corresponds to a reference configuration that was used on a corresponding vision machine when the lens identification calibration data for each of the plurality of lenses was determined comprises placing the vision machine into a reference configuration that fully corresponds to the reference configuration that was used on a vision machine of the same type when the lens identification calibration data for each of the plurality of lenses was determined.

12. The method of claim 11, wherein placing the vision machine into the reference configuration that at least substantially corresponds to a reference configuration that was used on a corresponding vision machine comprises placing the vision machine into the reference configuration that was used on that same vision machine when the lens identification calibration data for each of the plurality of lenses was determined on that same vision machine.

13. The method of claim 1, wherein:

the vision machine further comprises a plurality of turret lens positions;

the lens identification calibration data for each of the plurality of lenses is further based on at least one respective light source level setting and at least one respective camera output obtained for that respective light source level setting for each of a plurality of turret lens positions; and the method further comprises:

performing each of the setting, transferring and determining steps for a plurality of turret lens positions; and comparing data based on the at least one camera output and the at least one light source level with the lens identification calibration data comprises comparing relationship data, the relationship data determined based on a relationship between the at least one camera output and the at least one light source level corresponding to a first turret lens position and the at least one camera output and the at least one light source level corresponding to at least a second turret lens position.

14. The method of claim 13, wherein:

performing the setting step for the first turret lens position comprises performing each of the setting, transferring and determining steps until the determined camera output adequately matches a predetermined camera output; and performing the setting step for the second turret lens position comprises setting the light source level at the same light source level used when the determined camera output adequately matches the predetermined camera output for the first turret lens position.

15. The method of claim 14 wherein performing each of the setting, transferring and determining steps until the determined camera output adequately matches a predetermined camera output comprises performing each of the setting, transferring and determining steps until the determined camera output adequately matches a predetermined camera output that was used when the lens identification calibration data for each of the plurality of lenses was determined.

16. The method of claim 14, wherein:

the lens identification calibration data was determined using a different type of calibration-determining vision machine than the vision machine; and comparing the relationship data comprises:

identifying at least one respective turret attenuation ratio for at least one of the first and second turret lens positions, and compensating the relationship data using the at least one respective turret attenuation ratio.

* * * * *